United States Patent [19]

Nagayoshi et al.

[11] Patent Number: 4,824,502

[45] Date of Patent: Apr. 25, 1989

[54] METHOD AND APPARATUS FOR MANUFACTURING A PLASTIC PIPE

[75] Inventors: Akio Nagayoshi; Kiyoharu Nagayoshi, both of Sakai, Japan

[73] Assignees: UC Industry Co., Ltd., Osaka; Tonen Sekiyukagaku Kabushiki Kaisha, Tokyo, both of Japan

[21] Appl. No.: 163,681

[22] Filed: Mar. 3, 1988

[30] Foreign Application Priority Data

| Mar. 6, 1987 | [JP] | Japan | 62-52289 |
| Mar. 6, 1987 | [JP] | Japan | 62-52290 |
| Apr. 21, 1987 | [JP] | Japan | 62-98372 |
| Jun. 9, 1987 | [JP] | Japan | 62-144459 |

[51] Int. Cl.$^4$ ............................................. B65H 81/00
[52] U.S. Cl. ................................. 156/195; 156/190; 156/244.15; 156/429
[58] Field of Search ............... 156/189, 190, 193, 194, 156/195, 143, 144, 244.13, 244.15, 425, 428, 429, 168, 191; 138/122, 129, 144, 150, 154, DIG. 8

[56] References Cited

U.S. PATENT DOCUMENTS

| 4,354,051 | 10/1982 | Kutnyak | 138/129 X |
| 4,368,088 | 1/1983 | Asakura et al. | 156/195 X |
| 4,375,381 | 3/1983 | Carlson et al. | 156/244.15 X |
| 4,459,168 | 7/1984 | Anselm | 156/429 X |
| 4,575,400 | 3/1986 | Veda et al. | 156/195 X |

FOREIGN PATENT DOCUMENTS 0046379 4/1978 Japan .................................... 156/195

Primary Examiner—David Simmons
Assistant Examiner—Steven D. Maki
Attorney, Agent, or Firm—Armstrong, Nikaido, Marmelstein & Kubovcik

[57] ABSTRACT

A method of manufacturing a plastic pipe having a spiral ridge on an outer surface and a flat inner surface, comprising the steps of: (a) supplying a plastic ribbon in a softened state onto a plurality of rotating forming rolls arranged circularly, so that the plastic ribbon is spirally wound around the forming rolls while partially overlapping to be fused with each other; (b) spirally winding an endless forming core belt around the forming rolls in such a manner that the endless forming core belt is sandwiched between the plastic ribbon already wound around the forming rolls and the plastic ribbon newly supplied, thereby providing the resulting plastic pipe with a spiral ridge; (c) cutting the spiral ridge after the plastic ribbon is fused with each other and sufficiently cooled, thereby providing the spiral ridge with a slit extending along it to remove the endless forming core belt from it; and (d) winding a second plastic ribbon in a softened state around the spiral ridge to fuse the second plastic ribbon thereto, thereby sealing the slit.

9 Claims, 13 Drawing Sheets

METHOD AND APPARATUS FOR MANUFACTURING A PLASTIC PIPE

BACKGROUND OF THE INVENTION

The present invention relates to a so-called corrugated plastic pipe having a spiral ridge on an outer surface thereof, a method and an apparatus for manufacturing such plastic pipe.

Corrugated plastic pipes having a spiral ridge on an outer surface and a flat inner surface have been getting wider applications in houses and other constructions.

To integrally form such corrugated plastic pipes having a spiral outer layer and a flat inner wall, various methods are generally used as follows:

(a) First spirally winding a plastic ribbon in a softened state with its side edges overlapped and fused to form an inner wall, and then spirally winding a formed plastic ribbon having a longitudinal ridge around the inner wall, thereby providing the resulting plastic pipe with a spiral ridge-and-groove outer surface.

(b) Forming a plastic ribbon having a longitudinal ridge and flat side edges and spirally winding the plastic ribbon with its side edges overlapped and fused to provide the resulting plastic pipe with a spiral outer surface and a flat inner wall simultaneously.

In the above two methods, a flat or formed plastic ribbon is used to provide a hollow ridge spirally extending on the outer surface of a plastic pipe. On the other hand, it is hypothetically possible to use a forming core belt which is sandwiched between an upper plastic ribbon and a lower plastic ribbon, thereby providing a plastic pipe with a spiral ridge filled with the core belt. However, there is no means to remove the core belt after completion of the plastic pipe. Therefore, this method cannot provide plastic pipes with hollow spiral ridges.

Japanese Patent Laid-Open No. 51-37969 discloses a method of manufacturing a corrugated plastic pipe by using a flat plastic ribbon attached to the bottom surface of a forming core belt and flat plastic ribbon wound over the core belt. The forming core belt and the flat plastic ribbon are spirally wound around a core cylinder to form the corrugated plastic pipe. After solidification, the core belt and the inner ribbon are removed from the resulting plastic pipe, thereby providing a corrugated pipe having spiral surfaces on both outer and inner sides. This method is, however, disadvantageous in that the plastic pipe produced thereby cannot have a flat inner surface.

On the other hand, with respect to an apparatus for manufacturing a plastic pipe of such a structure, a conventional one comprises a plurality of rotatable forming rolls arranged on a hypothetical cylindrical surface, one end of each rotatable forming roll being supported by a support base like a cantilever and operably connected with a driving means. Each rotatable forming roll is slightly inclined with respect to the axis of the above hypothetical cylindrical surface. An extruder is positioned near the rotatable forming rolls, and an extruded resin ribbon is supplied to the forming rolls so that it is spirally wound around the forming rolls with its side edges overlapped. With all of the forming rolls rotating simultaneously in the same direction, the plastic ribbon is continuously conveyed toward the tip ends of the rotatable forming rolls while being formed into a tubular body with its side edges overlapped. Since the plastic ribbon is still sufficiently hot on the rotatable forming rolls, the partially overlapped plastic ribbon is completely formed into a plastic pipe which is withdrawn continuously from the tip ends of the rotatable forming rolls.

In the above conventional method and apparatus, however, it is generally difficult to form a spiral ridge on the outer surface of the plastic pipe without suffering from the deformation of the spiral ridge if the spiral ridge is hollow. This is because a plastic ribbon to be formed into the plastic pipe is in a softened state, namely in a state which enables the adjacent plastic ribbons to be fused with each other when overlapped. The use of a forming core belt can avoid such deformation of the spiral ridge, but it suffers from the disadvantage that a plastic pipe containing the forming core belt is generally heavy and not easy to bend.

OBJECT AND SUMMARY OF THE INVENTION

An object of the present invention is, therefore, to provide a corrugated plastic pipe having a hollow, spiral ridge on an outer surface and a flat inner surface.

Another object of the present invention is to provide a method of manufacturing such a corrugated plastic pipe.

A further object of the present invention is to provide an apparatus for manufacturing such a corrugated plastic pipe.

In view of the above objects, the inventors have found that such a corrugated plastic pipe can be produced by using a forming core belt to ensure the formation of a spiral ridge of accurate shape, cutting the resulting spiral ridge to remove the core belt and closing the cut ridge with another plastic ribbon.

Thus, the plastic pipe having a spiral ridge on an outer surface and a flat inner surface according to the present invention is constituted by a spirally wound plastic ribbon comprising at least one ridge-shaped deformation extending longitudinally and provided with a longitudinal slit and flat portions extending on both sides of the ridge-shaped deformation, at least adjacent plastic ribbons being fused with each other in the flat portions so that the fused flat portions provide the flat inner sufface covering the bottom of the spiral ridge, and the longitudinal slit being sealed with a second plastic ribbon fused to the spiral ridge.

The method of manufacturing a plastic pipe having a spiral ridge on the outer surface and a flat inner surface according to the present invention comprises the steps of:

(a) supplying a plastic ribbon in a softened state onto a plurality of rotating forming rolls arranged circularly, so that the plastic ribbon is spirally wound around the forming rolls while partially overlapping to be fused with each other:

(b) spirally winding an endless forming core belt around the forming rolls in such a manner that the endless forming core belt is sandwiched between the plastic ribbon already wound around the forming rolls and the plastic ribbon newly supplied, thereby providing the resulting plastic pipe with a spiral ridge;

(c) cutting the spiral ridge after the plastic ribbon is fused with each other and sufficiently cooled, thereby providing the spiral ridge with a slit extending along it to remove the endless forming core belt from it: and (d) winding a second plastic ribbon in a softened state around the spiral ridge to fuse the second plastic ribbon thereto, thereby sealing the slit.

The apparatus for manufacturing a plastic pipe having a spiral ridge on an outer surface and a flat inner surface according to the present invention comprises:

(a) a plurality of rotatable forming rolls arranged circularly;

(b) first means positioned near the rear ends of the rotatable forming rolls for supplying a plastic ribbon in a softened state to the rotatable forming rolls;

(c) an endless forming core belt, part of which is wound around the rotatable forming rolls in such a manner that the endless forming core belt is sandwiched between the plastic ribbon already wound around the rotatable forming rolls and the plastic ribbon newly supplied from the first means, thereby providing the resulting plastic pipe with a spiral ridge:

(d) a cutter for providing the spiral ridge with a slit extending along it to remove the endless forming core belt therefrom; and (e) second means provided on the downstream of the cutter for supplying a second plastic ribbon which is to be fused to the spiral ridge to seal the slit.

DETAILED DESCRIPTION OF THE PREFERRED EMBODIMENT

Figure 1:
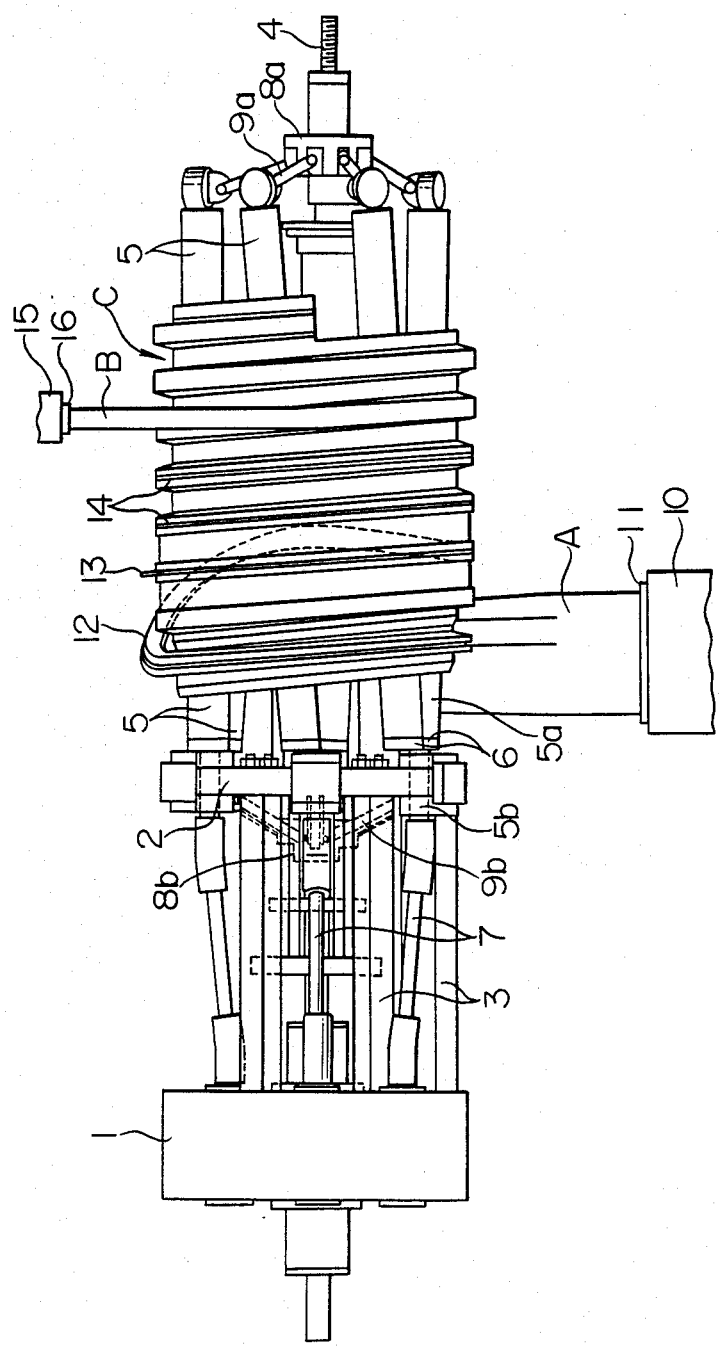
FIG. 1 is a side view showing the method of manufacturing a plastic pipe according to one embodiment of the present invention.

Referring to FIG. 1, the apparatus of the present invention comprises a base 1, a support plate 2, a plurality of support rods 3 for fixing the support plate 2 to the base 1, a central shaft 4 extending from the base 1 and rotatably supported by the base 1 and the support plate 2 via bearings.

Movably mounted on the central shaft 4 is a first operating means comprising a first movable member 8a threadably engaging the central shaft 4 and a plurality of first link rods 9a pivotally connected to the first movable member 8a. The first link rods 9a extend from the first movable member 8a radially with equal intervals. Likewise, a second operating means comprising a second movable member 8b is threadably mounted on the central shaft 4, and link rods 9b are pivatally connected to the second movable member 8b and extend therefrom radially with equal intervals. It is to be noted that the direction of theading is just opposite between the first movable member 8a and the second movable member 8b, so that the rotation of the central shaft 4 can move the first and second movable members 8a, 8b in opposite directions.

This apparatus comprises a plurality of rotatable forming rolls 5 pivotally connected to the link rods 9a, 9b at both ends. Therefore, a cylindrical envelope formed by the forming rolls 5 can be expanded or shrinked by rotating the central shaft 4.

An extruder 10 having a die 11 with a slit orifice is positioned near the rear ends of the forming rolls 5 to supply a flat plastic ribbon A thereto. However, it should be noted that the extruder die 11 may have an orifice capable of providing a plastic ribbon with one or more longitudinal ridge-shaped deformations. The plastic ribbon A is then spirally wound around the forming rolls 5 with its side edges overlapped. The spiral winding of the plastic ribbon A is caused by slight inclination of the forming rolls 5 as explained in detail below.

An endless forming core belt 12 is sandwiched between the plastic ribbon already wound around the forming rolls and the plastic ribbon newly supplied from the extruder 10. Because the plastic ribbon A just coming from the extruder 10 is still hot, it is sufficiently soft. Accordingly, it is easily deformed along the forming core belt 12 to provide a ridge-shaped deformation. This soft state of the plastic ribbon is generally called "softened state" herein. It should be noted that instead of the extruder 10, a heater for heating a plastic ribbon to soften it may be used.

The plastic ribbon A thus containing the forming core belt 12 moves toward the tip ends of the forming rolls 5 while being spirally wound around them with its side edges overlapped and fused with each other. The forming core belt 12 is also spirally wound around the forming rolls 5 in the spiral ridge of the resulting plastic pipe C. After several turns, the plastic ribbon A spirally wound and fused is sufficiently cooled and so solidified.

A cutter 13 is provided near the forming rolls 5 to cut the spiral ridge of the resulting plastic pipe C after sufficiently solidified. Since the spiral ridge is strongly supported by the forming core belt 12 contained therein, it is easily cut without deformation. After cutting, the forming core belt 12 is withdrawn from the spiral ridge through a slit 14 given by the cutter 13 and goes back to the original position at which it is sandwiched by the upper and lower plastic ribbons.

A second extruder 15 with a small, flat die 16 is positioned near the forming rolls on the downstream of the cutter 13 to supply a second plastic ribbon B similarly in a softened state onto the spiral ridge of the plastic pipe C. The second plastic ribbon B has a width capable of sufficiently covering the slit 14. Since the top surface of the spiral ridge is relatively narrow, the second plastic ribbon B may be narrow. The second plastic ribbon B, which is still hot when it reaches the spiral ridge, is easily fused to the spiral ridge, thereby sealing the slit. Thus, the corrugated plastic pipe having a hollow spiral ridge on an outer surface and a flat inner surface can be manufactured continuously.

The apparatus for manufacturing such a corrugated plastic pipe according to a preferred embodiment of the present invention will be explained in detail below.

Figure 2:
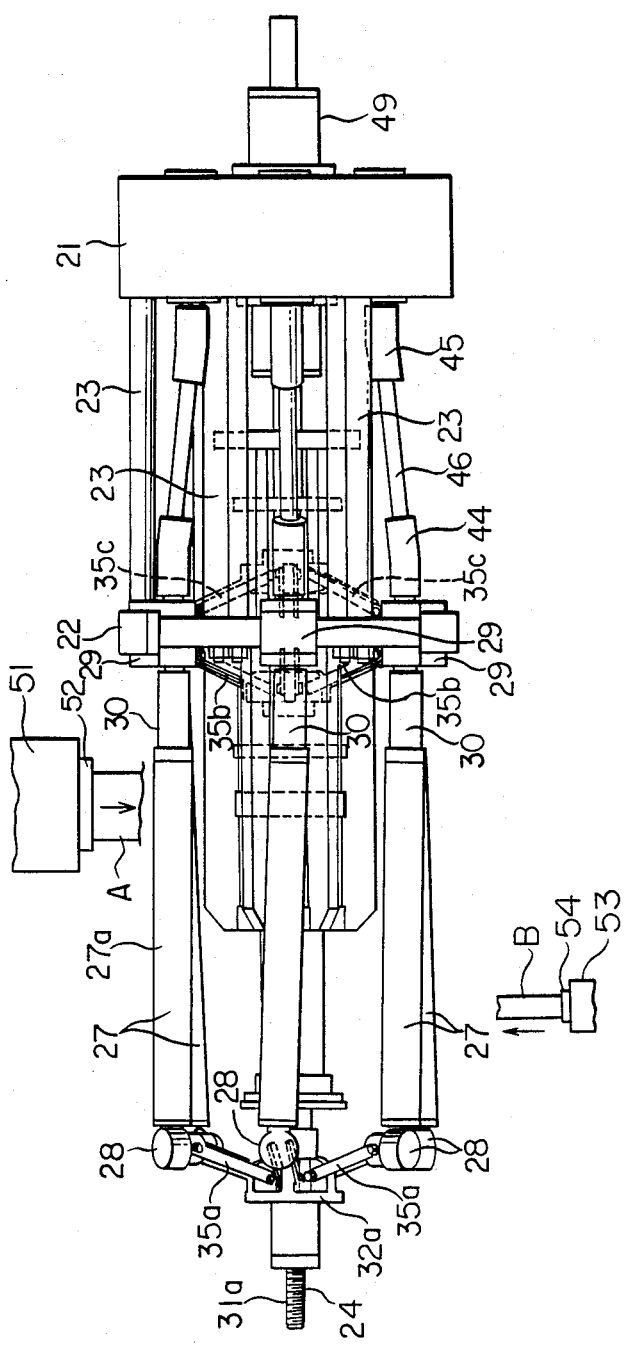
FIG. 2 is a side view of the apparatus for manufacturing a plastic pipe according to one embodiment of the present invention.
Figure 3:
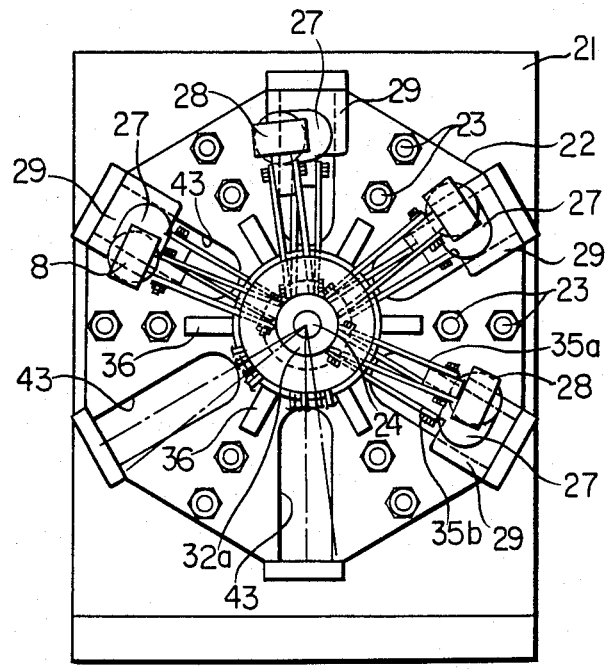
FIG. 3 is a front view of the apparatus of FIG. 2.
Figure 4:
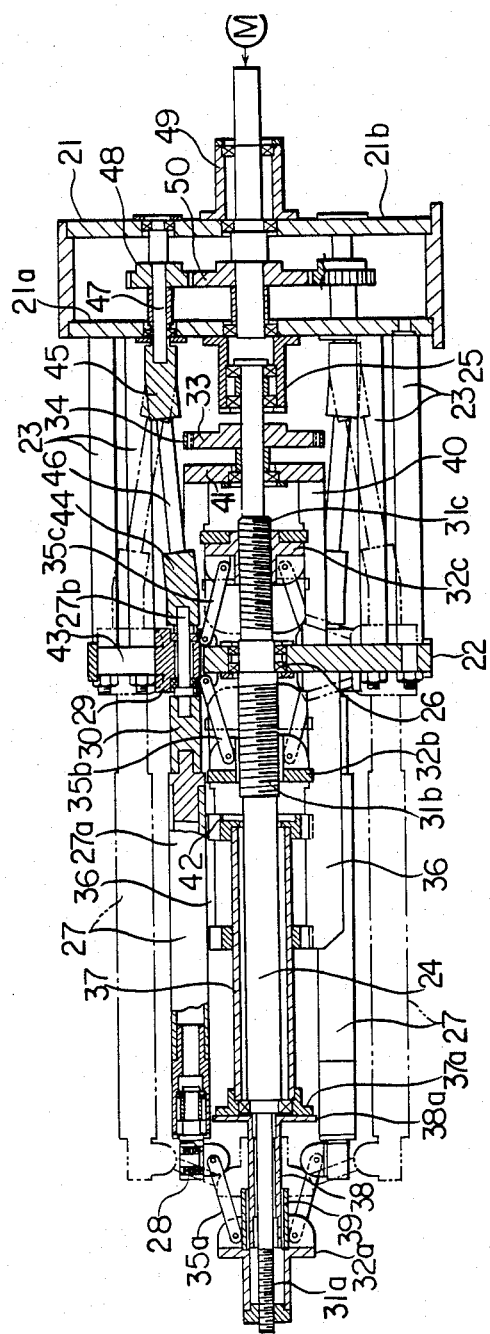
FIG. 4 is a cross-sectional view of the apparatus of FIG. 2.

Referring to FIGS. 2-4, the apparatus for manufacturing a plastic pipe comprises a base 21, a support plate 22, a plurality of support rods 23 for fixing the support plate 22 to the base 21, a central shaft 24 extending from the base 21 and rotatably supported by the base 21 and the support plate 22 via bearings 25, 26.

According to this embodiment, the support plate 21 is provided with 6 radial slots 43 extending from near the bearing 26 to near a periphery of the support plate 22 with equal circular intervals as shown in FIG. 3. The support plate 22 is also fixedly provided with a lateral support member 36 extending laterally from the support plate 22 and having 6 support blades radially projecting therefrom with equal circular intervals.

The central shaft 24 has a first threaded portion 31a at a tip end thereof, a second threaded portion 31b near the support plate 22 on the same side as the first threaded portion 31a, and a third threaded portion 31c near the support plate 22 on the opposite side to the first and second threaded portions 31a, 31b. The first threaded portion 31a and the second threaded portion 31b have the same spiral direction, and the third threaded portion 31c has an opposite spiral direction to those of the first and second threaded portions 31a, 31b.

Movably mounted on the first threaded portion 31a is a first operating means comprising a first movable member 32a having a threaded inner wall threadably engaging the first threaded portion 31a, and a plurality of first link rods 35a pivotally connected to the first movable member 32a. The first link rods 35a extend from the first movable member 32a radially with equal intervals. In this embodiment, the number of the first link rods 35a is 6. Likewise, a second operating means comprises a second movable member 32b threadably mounted on the second threaded portions 31b, and 6 link rods 35b pivotally connected to the second movable member 32b and extending therefrom radially with equal intervals. And a third operating means comprises a third movable member 32c threadably engaging the third threaded portion 31c, and 6 link rods 35c pivotally connected to the third movable member 32c and extending therefrom radially with equal intervals.

The apparatus for manufacturing a plastic pipe according to this embodiment comprises a plurality of (6) rotatable forming rolls 27, and a tip end of each rotatable forming roll 27 is pivotally supported by one of the first link rods 35a at a tip end thereof via a first bearing 28, and a rear end of each rotatable forming roll 27 is pivotally supported by each second and third link rod 35b, 35c and flexibly connected with a flexible link means, which will be described in detail below.

Each flexible link means comprises a short shaft 27b connected to a roll body 27a of each rotatable forming roll 27 via a universal joint 30, a link rod 46 connected to the short shaft 27b via a universal joint 44, and a shaft 47 connected to the link rod 46 via a universal joint 45 and rotatably supported by bearings mounted on a front wall 21a and a rear wall 21b of the base 21. The short shaft 27b is rotatably supported by a second bearing 29 which is slidably received in the radial slot 43 of the support plate 22. The second bearing 29 is pivotally supported by the second link rod 35b and the third link rod 35c on both sides with respect to the support plate 22.

In this embodiment, a tubular body 37 is fixed to the lateral support plate 36 in such a manner that it surrounds the central shaft 24. The tubular body 37 has a flange 37a at a tip end thereof, which is fixed to a flange 38a of an inner tube member 38 surrounding the central shaft 24 with a small gap which permits the central shaft 24 to rotate freely in the inner tube member 38. The inner tube member 38 is provided with a spline extending axially on an outer surface thereof, and an outer tube member 39 fixed to the first movable member 32a is provided, on an inner surface thereof, with an axial spline engageable with the spline of the inner tube member 38. Because of this structure, the first movable member 32a can move back and forth along the central shaft 24 without rotation by the rotation of the central shaft 24. Incidentally, by changing an angular position of either of the inner tube member 38 or the outer tube member 39 around the axis of the central shaft 24, the direction of each rotatable forming roll 27 can be adjusted along the axis of the central shaft 24. Preferably, the rotatable forming rolls 27 are slightly inclined on an envelope formed thereby as shown in FIG. 3. The angular adjustment of the first movable member 32a can also be achieved by changing the angular position of the inner tube member 38 relative to the tubular body 37.

The lateral support plate 36 has a stopper 42 around the central shaft 24, which regulates the leftward movement of the second movable member 32b. Likewise, a lateral support plate 40 fixed to the support plate 22 has a stopper 41 around the central shaft 24, which regulates the rightward movement of the third movable member 32c. Due to the stoppers 41, 42, a minimum radius of the envelope formed by the rotatable forming rolls 27 is determined.

The central shaft 24 is fixedly provided with a gear 33 operably engageable with a timing belt 34 which is connected with a driving means (not shown). Through the timing belt 34 and the gear 33, the central shaft 24 is rotated independently of the rotatable forming rolls 27.

As is clearly shown in FIG. 4, each shaft 47 is fixedly provided with a small gear 48 meshed with a large gear 50 fixed to a shaft rotatably supported by the base 21 via a bearing 49, and the above shaft is connected with a driving means M. Since each of the small gears 48 is meshed with the large gear 50, the rotatable forming rolls 27 rotate simultaneously in the same direction.

An extruder 51 with a die 52 is positioned near the rear or root portions of the rotatable forming rolls 27, and an extruded plastic ribbon "A" is supplied to the forming rolls 27 as in FIG. 1, so that it is continuously wound around the rotatable forming rolls 27 with its side edges overlapped.

With the above-described apparatus, the manufacturing of a plastic pipe will be described in detail below.

First, to achieve the desired radius of envelope formed by the rotatable forming rolls 27, the central shaft 24 is rotated leftward or rightward to move the first, second and third movable members 32a, 32b, 32c along the central shaft 24 by the desired distance. Since the first threaded portion 31a and the second threaded portion 31b have the same spiral direction and the third threaded portion 31c has an opposite spiral direction, the first movable member 32a and the second movable member 32b move in the same direction while the third movable member 32c moves in the opposite direction. Because the rotatable forming rolls 27 are supported by the first, second and third movable members 32a, 32b, 32c via pivotally movable link rods 35a, 35b, 35c, the radial positions of the rotatable forming rolls 27 are changed by axially moving the movable members 32a, 32b, 32c. In other words, the radius of the envelope formed by the rotatable forming rolls 27 is adjusted by rotating the central shaft 24, so that a plastic pipe to be formed can have the desired diameter.

With this position, each rotatable forming roll 27 is rotated simultaneously in the same direction via each flexible link means operably connected with the motor M. The plastic ribbon "A" ejected from the extruder 51 through the die 52 with the desired inclination with respect to the axis of the central shaft 24 is supplied onto the rotatable forming rolls 27. The rotation speed of the rotatable forming rolls 27 and the inclination and supply speed of the plastic ribbon "A" are adjusted so that the plastic ribbon "A" is wound around the rotatable forming rolls 27 with its side edges overlapped to the desired degree. Since the plastic ribbon "A" is still hot when overlapped, the partially overlapped plastic ribbon is integrally formed into a plastic pipe which is continuously withdrawn from the tip ends of the rotatable forming rolls 27.

Next, if a plastic pipe of a different diameter is desired, the central shaft 24 is rotated to cause the rotatable forming rolls 27 to have the desired radius of envelope via the operating means. Like this, changing the radius of envelope of the rotatable forming rolls 27 can easily be conducted simply by rotating the central shaft 24.

In the above apparatus the circular arrangement of the rotatable forming rolls 27 is changeable, but it should be noted that the rotatable forming rolls 27 need not be changeable as in conventional apparatuses for the purpose of the present invention.

Figure 5:
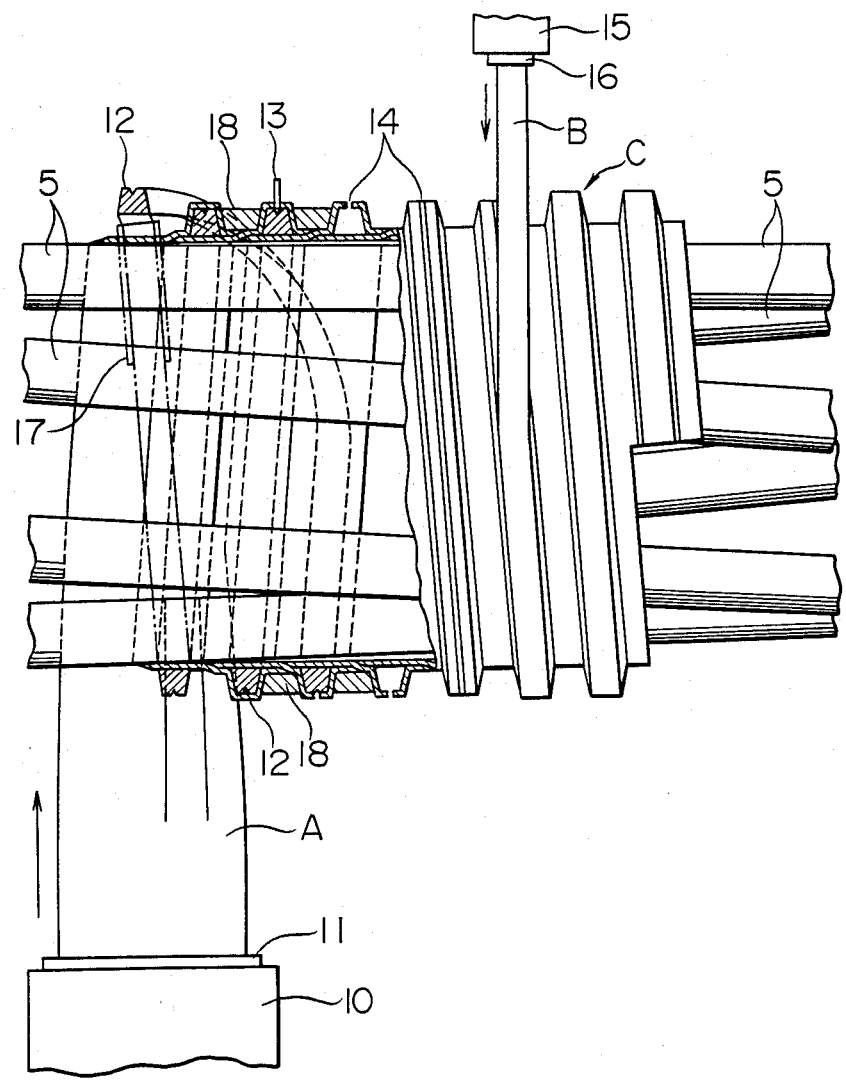
FIG. 5 is a partially cross-sectional, side view of the important portion of FIG. 1.

FIG. 5 shows in detail how a plastic pipe is manufactured by the apparatus of FIG. 1 according to the present invention. As explained in connection with FIG. 1, the plastic ribbon A is spirally wound with partial overlapping, and the forming core belt 12 is sandwiched between the overlapped portions of the plastic ribbon A, thereby providing the resulting plastic pipe C with a spiral ridge. In order to ensure the formation of the spiral ridge of accurate shape, a second forming belt 18 is wound around the plastic pipe C by a couple of turns. In this embodiment, the second forming belt 18 is endless, and so a guide roll (not shown) is used to circulate it. However, it should be noted that one or more independent second forming belts 18 may be used for the same purpose. In this case, each second forming belt 18 is pulled downwardly by a weight or any other means. In any case, the second forming belt 18 is received in a groove between the adjacent spiral ridges formed on the outer surface of the plastic pipe C. Therefore, the second forming belt 18 should have a complementary cross section to that of the endless forming core belt 12. If the forming core belt 12 has a trapezoidal cross section, the second forming belt 18 should also have a trapezoidal cross section.

As in FIG. 1, the cutter 13 provides the spiral ridge of the plastic pipe C with a slit 14 extending along the spiral ridge. This slit 14 makes it possible to remove the forming core belt 12 from the spiral ridge of the plastic pipe C. Since the spiral ridge of the plastic pipe C is cut after it is fully cooled and solidified, the spiral ridge can retain its original shape even after removing the forming core belt 12 through the slit 14. Finally, the narrow second plastic ribbon B supplied from the extruder 15 is wound around the spiral ridge. Since the narrow plastic ribbon B is still hot and soft when it reaches the spiral ridge, it is easily fused to the spiral ridge to seal the slit 14.

Figure 6:
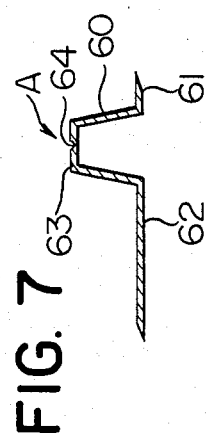
FIG. 6 is a cross-sectional view of the plastic ribbon according to one embodiment of the present invention.

FIG. 6 shows a cross section of the plastic ribbon A formed into the plastic pipe C manufactured by the method shown in FIG. 5. This plastic ribbon A has a ridge-shaped deformation 60, a narrow side portion 61 and a wide side portion 62. Since the ridge-shaped deformation 60 has a trapezoidal cross section, it has a top wall 63 which is to be cut. Also, since the plastic pipe formed from the plastic ribbon A should have a flat inner surface, the plastic ribbon A should be spirally overlapped in such a manner that the narrow side portion 61 and part of the wide side portion 62 of the plastic ribbon A should be fused to the wide side portion 62 of the preceding plastic ribbon A (already wound around the forming rolls). In this sense, the narrow side portion 61 may be called "front side portion," and the wide side portion 62 "rear side portion."

Figure 7:
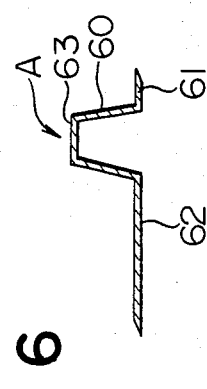
FIG. 7 is a cross-sectional view of the plastic ribbon according to another embodiment of the present invention.

FIG. 7 shows a plastic ribbon A having a notch 64 on the top wall 63 of the ridge-shaped deformation 60. Except for that, it is just the same as the plastic ribbon A of FIG. 6.

Figure 8:
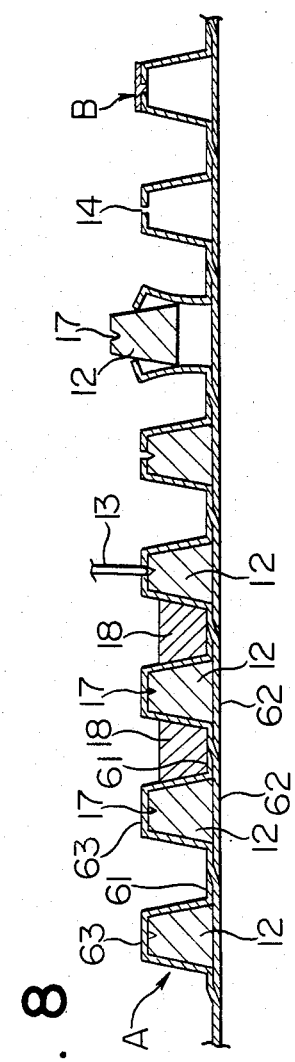
FIG. 8 is an enlarged cross-sectional view showing the production of a spiral ridge on the outer surface of a plastic pipe according to one embodiment of the present invention.

FIG. 8 schematically shows the production of the spiral ridge from the plastic ribbon A shown in FIG. 6. As explained above, the narrow (front) side portion 61 and part of the wide (rear) side portion 62 of the plastic ribbon A is fused to the wide (rear) side portion 62 of the preceding plastic ribbon A, and a plurality of the second forming belts 18 are received in spiral grooves defined by the spiral ridges. The spiral ridge is then provided with a slit 14 by the cutter 13 to remove the endless forming core belt 12. The hollow spiral ridge thus produced is coated with the narrow plastic ribbon B fused thereto, whereby the slit 14 is completely sealed.

Figure 9:
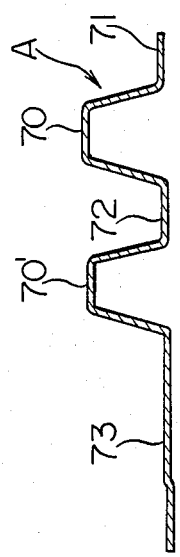
FIG. 9 is an enlarged cross-sectional view showing a spiral ridge of the plastic pipe having a narrow plastic ribbon fused thereto.

FIG. 9 shows in detail a typical example of the spiral ridge 60 coated with the narrow plastic ribbon B. Since the narrow plastic ribbon B is fused to the top wall 63 of the spiral ridge 60, the slit 14 is filled with part of the narrow plastic ribbon B as clearly shown in FIG. 9.

Figure 10:
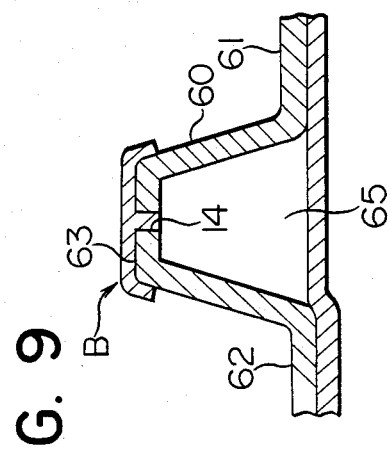
FIG. 10 is an enlarged cross-sectional view of the plastic ribbon according to a further embodiment of the present invention.
Figure 11A:
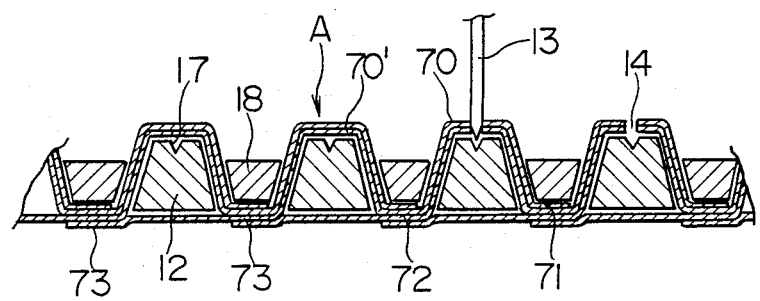
FIGS. 11A and 11B are enlarged cross-sectional views showing the production of a spiral ridge on the outer surface of a plastic pipe according to another embodiment of the present invention.
Figure 11B:
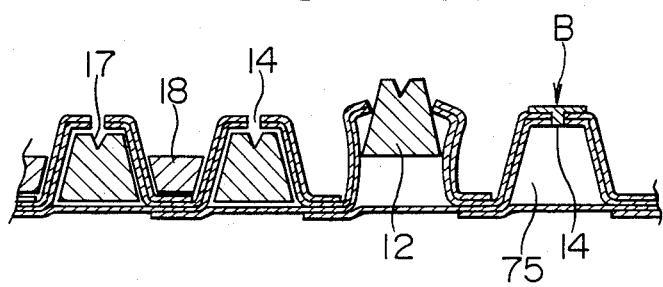
Figure 12:
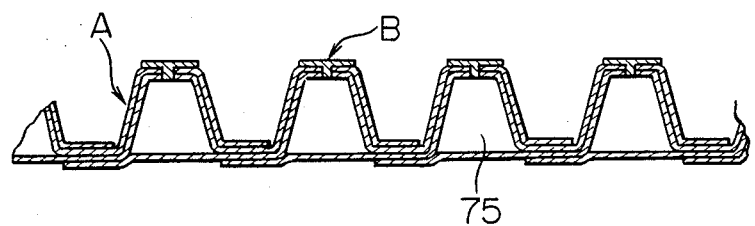
FIG. 12 is an enlarged cross-sectional view of the spiral ridge produced by the method shown in FIGS. 11A and 11B.
Figure 13:
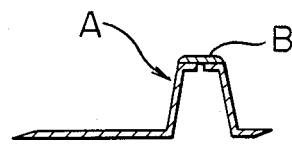
FIGS. 13-16 are enlarged cross-sectional views of the plastic ribbons whose slits on their ridges are sealed by various plastic ribbons.
Figure 14:
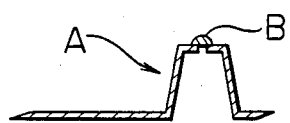
Figure 15:
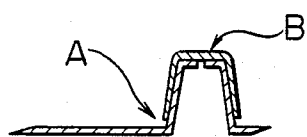
Figure 16:
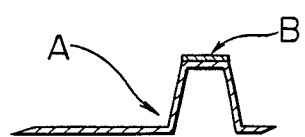

FIG. 10 shows another example of the plastic ribbon A formed into the plastic pipe C. In this example, the plastic ribbon A has two ridge-shaped deformations 70, 70', a narrow side portion 71, a wide side portion 73 and an intermediate portion 72. FIGS. 11A and 11B show in detail the production of the spiral ridge from the plastic ribbon A of FIG. 10. The ridge-shaped deformation 70 covers the underlying ridge-shaped deformation 70' of the preceding plastic ribbon A previously wound around the forming rolls, and the intermediate portion 72 and the wide side portion 73 of the plastic ribbon A are fused to the wide side portion 73 of the preceding plastic ribbon. Also, the narrow side portion 71 of the plastic ribbon A is fused to the intermediate portion 72 of the preceding plastic ribbon. Thus, the plastic ribbon A is continuously overlapped and fused to form the plastic pipe C with a single spiral ridge. Grooves defined by the spiral ridges are filled with second forming belts 18 which serve to form the spiral ridges of accurate shape in cooperation with the forming core belt 12. Of course, the second forming belts 18 may be a single endless forming belt wound around the plastic pipe C or individual belts each pulled downwardly by a weight. After sufficiently cooled and solidified, the spiral ridge is cut by a cutter 13 to provide a slit 14 which makes it possible to remove the forming core belt 12 contained therein. Finally, the slit 14 of the spiral ridge is sealed by a narrow plastic ribbon B fused to the spiral ridge. The spiral ridge thus completed is hollow as indicated by reference numeral 75 in FIGS. 11B and 12.

FIGS. 13-16 show the plastic ribbons A coated with various narrow plastic ribbons B to seal their slits. In any case, what is important is to completely cover the slit with the narrow plastic ribbon B.

Figure 17:
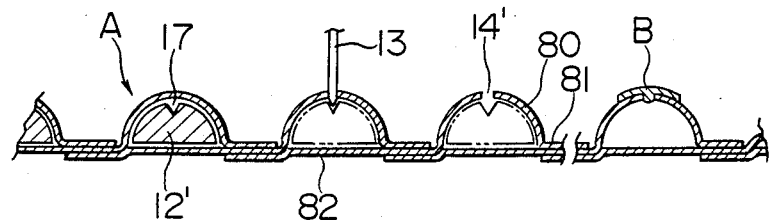
FIG. 17 is an enlarged cross-sectional view showing the production of a spiral ridge on the outer surface of a plastic pipe according to a further embodiment of the present invention.

FIG. 17 shows a further example of the spiral ridge, which has a circular cross section. In this example, the endless forming core belt 12' of a semicircular cross section is used. With this endless forming core belt 12', the spiral ridge can be produced in the same manner as above.

Figure 18:
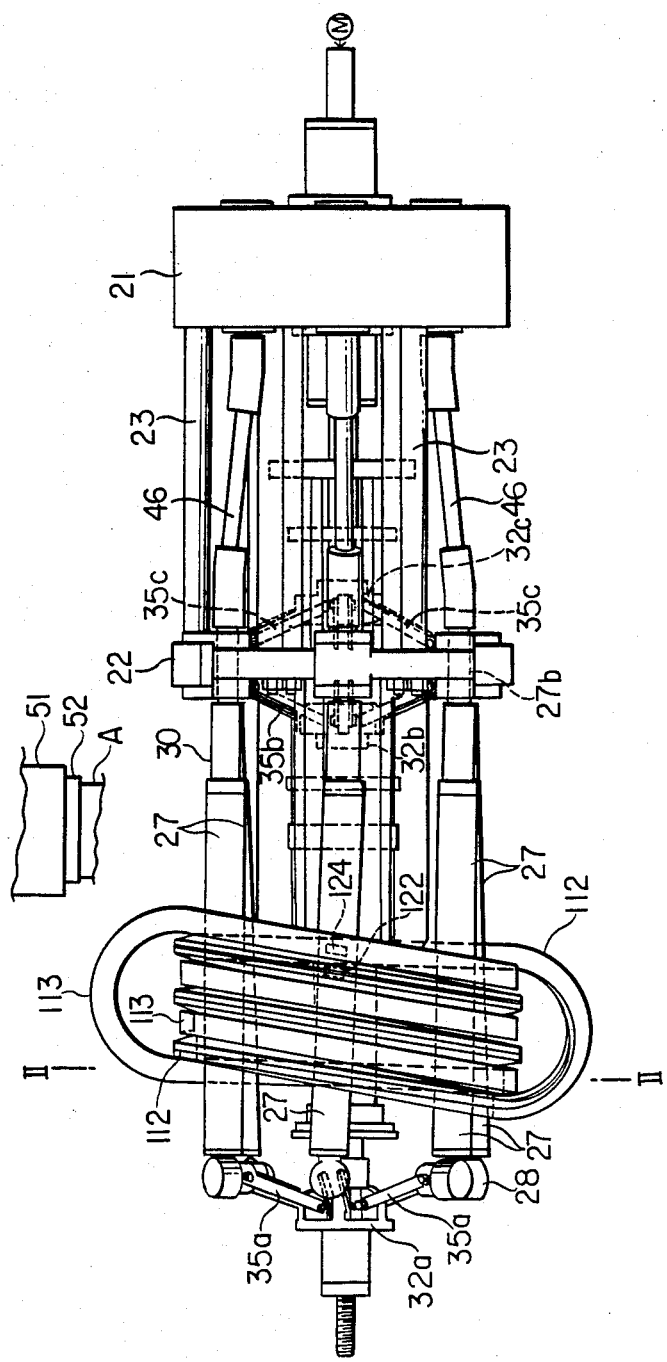
FIG. 18 is a side view showing the method of manufacturing a plastic pipe according to another embodiment of the present invention.

FIG. 18 shows a still further example of the apparatus according to the present invention. The apparatus per se is substantially the same as that of FIGS. 2-4. In this apparatus, an endless forming core belt 112 and a second endless forming belt 113 are wound around the forming rolls 27 via guide rolls 122, 124, respectively.

Figure 19:
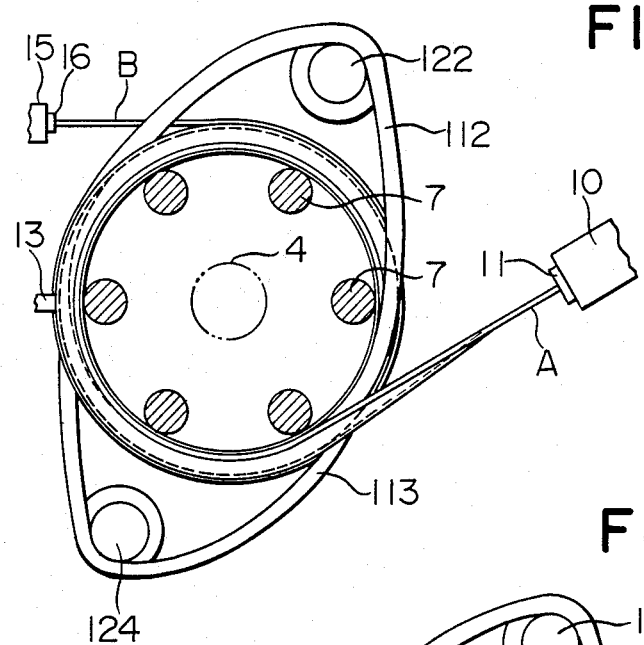
FIG. 19 is an end view showing the relations of a plastic ribbon, an endless forming core belt, an endless second forming belt and a narrow plastic ribbon.
Figure 20:
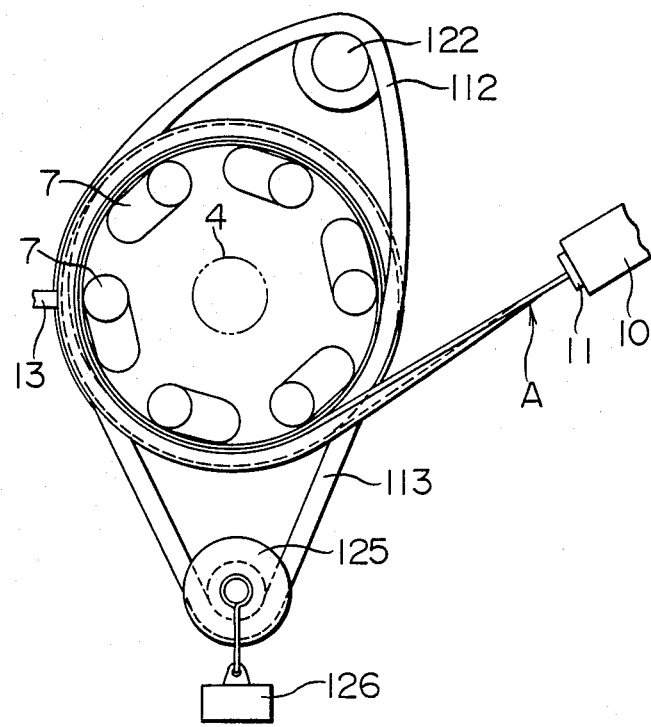
FIG. 20 is an end view showing the relations of a plastic ribbon, an endless forming core belt and an endless second forming belt.

One example of the circulation of the endless forming core belt 112 and the second endless forming belt 113 is shown in FIG. 19. In this example, both the forming core belt 112 and the second forming belt 113 are wound around the forming rolls 7 and circulate through the guide rolls 122, 124, respectively. FIG. 20 shows another example of the circulation of the second forming belt 113, in which the second forming belt 113 circulates through a pulley 125 pulled downwardly by a weight 126.

Figure 21:
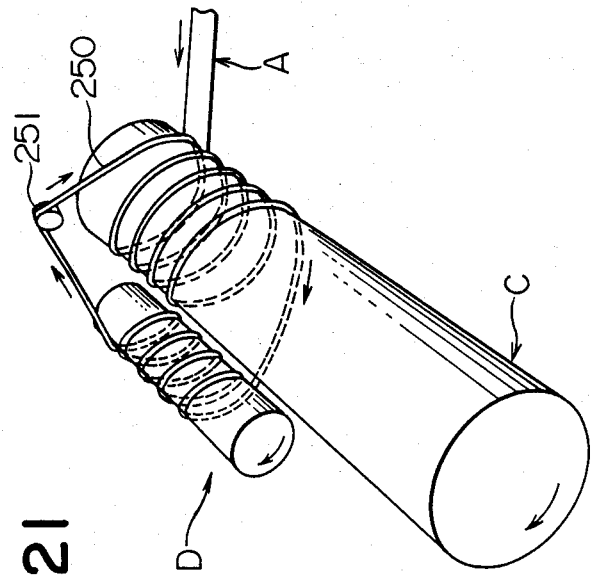
FIG. 21 is a schematic view showing the circulation of an endless forming core belt according to a still further embodiment of the present invention.

FIG. 21 schematically shows a still further example of the circulation of an endless forming core belt 250. In this example, a rotatable means D is positioned near the plastic pipe C wound around the forming rolls of the apparatus of the present invention, and the endless forming core belt 250 circulates among the forming rolls, the rotatable means D and a guide roll 251. Specifically speaking, the endless forming core belt 250 is supplied to the forming rolls in such a manner that it is sandwiched between the preceding plastic ribbon A already wound around the forming rolls and the plastic ribbon A newly supplied, and wound around the forming rolls by a plurality of turns toward the tip ends of the forming rolls while being sandwiched between the upper and lower plastic ribbon portions overlapped and fused with each other. The endless forming core belt 250 is then spirally wound around the rotatable means D by a plurality of turns in the opposite direction, namely toward the rear end of the rotatable means D. It finally goes back to the forming rolls through the guide roll 251.

Figure 22:
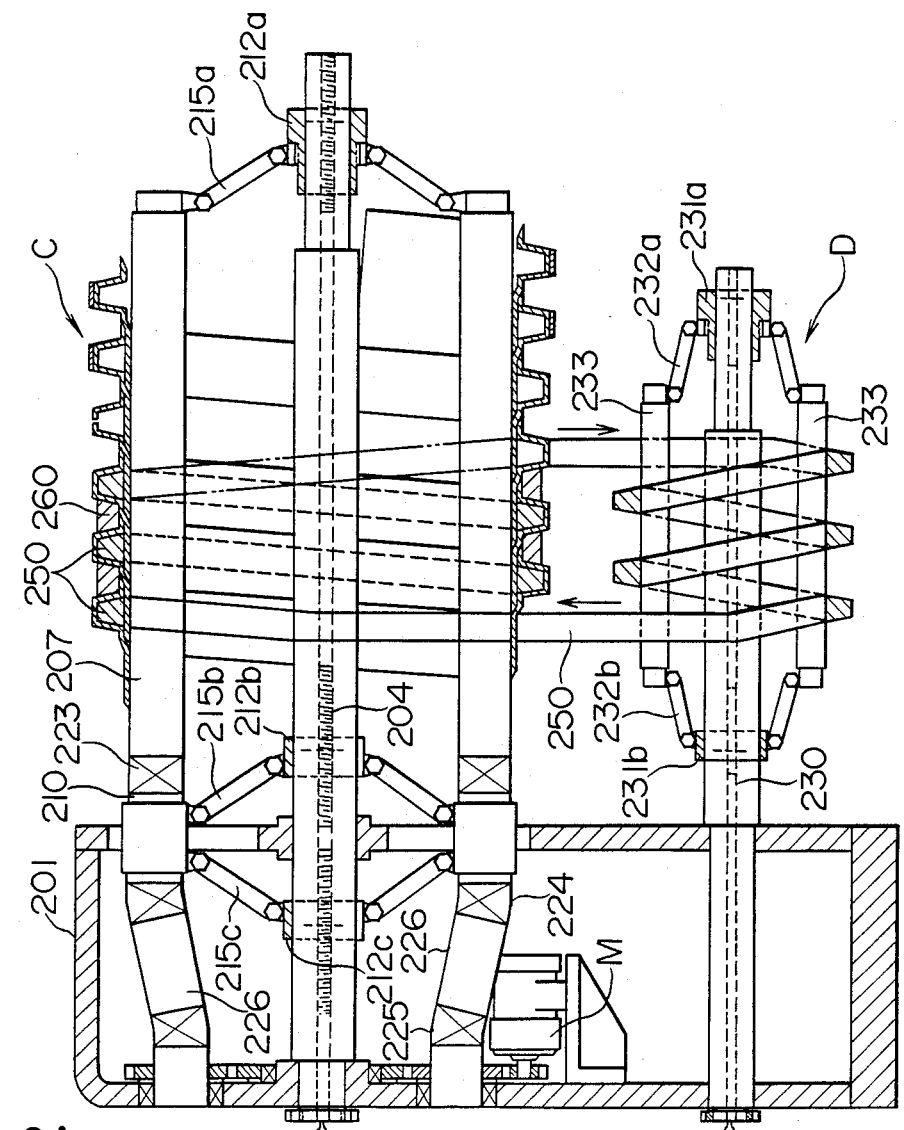
FIG. 22 is a cross-sectional view of the apparatus for manufacturing a plastic pipe according to a still further embodiment of the present invention.

FIG. 22 shows a specific example of an apparatus in which the endless forming core belt 250 circulates in a manner shown in FIG. 21. The apparatus of manufacturing a plastic pipe itself has substantially the same structure as that shown in FIGS. 2-4, except for some minor differences. The apparatus comprises a central shaft 204 rotatably supported by a base 201, first, second and third movable members 212a, 212b, 212c, link rods 215a, 215b, 215c pivotally connected to the first, second and third movable members 212a, 212b, 212c, respectively, forming rolls 207 pivotally supported by the link rods 215a, 215b, 215c, short rods 210 connected to the forming rolls 207 via universal joints 223, and link rods 226 connected to the short rods 210 via universal joints 224 and also connected, via universal joints 225, to rods driven by a motor M through gears. Mounted to the base 201 in parallel with the forming rolls 207 is the rotatable means D which comprises a second central shaft 230 rotatably supported by the base 201, first and second movable members 231a, 231b, link rods 232a, 232b pivotally connected to the first and second movable members 231a, 231b, respectively, and rotatable rolls 233 pivotally supported by the link rods 232a, 232b at both ends. The first and second movable members 231a, 231b can move along the second central shaft 230 back and forth in opposite directions by rotating the second central shaft 230 in the same manner as the first and third movable members 212a, 212c.

The endless forming core belt 250 circulates between the forming rolls 207 and the rotatable rolls 223. Because of this configuration, smooth circulation of the endless forming core belt 250 is ensured. Incidentally, a second forming belt 260 may also be circulated similarly.

Figure 24:
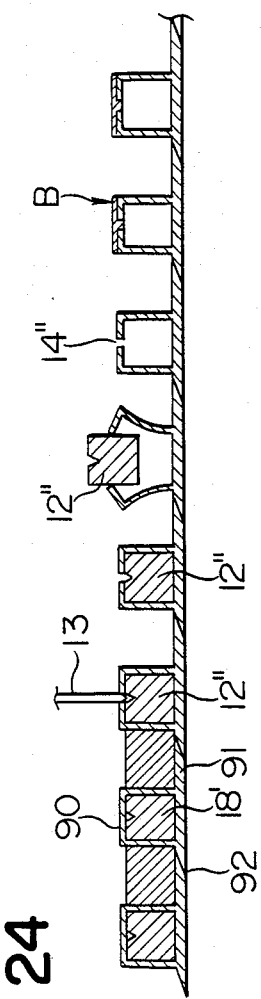
FIG. 24 is an enlarged cross-sectional view showing the production of a spiral ridge on the outer surface of a plastic pipe according to a still further embodiment of the present invention.
Figure 23:
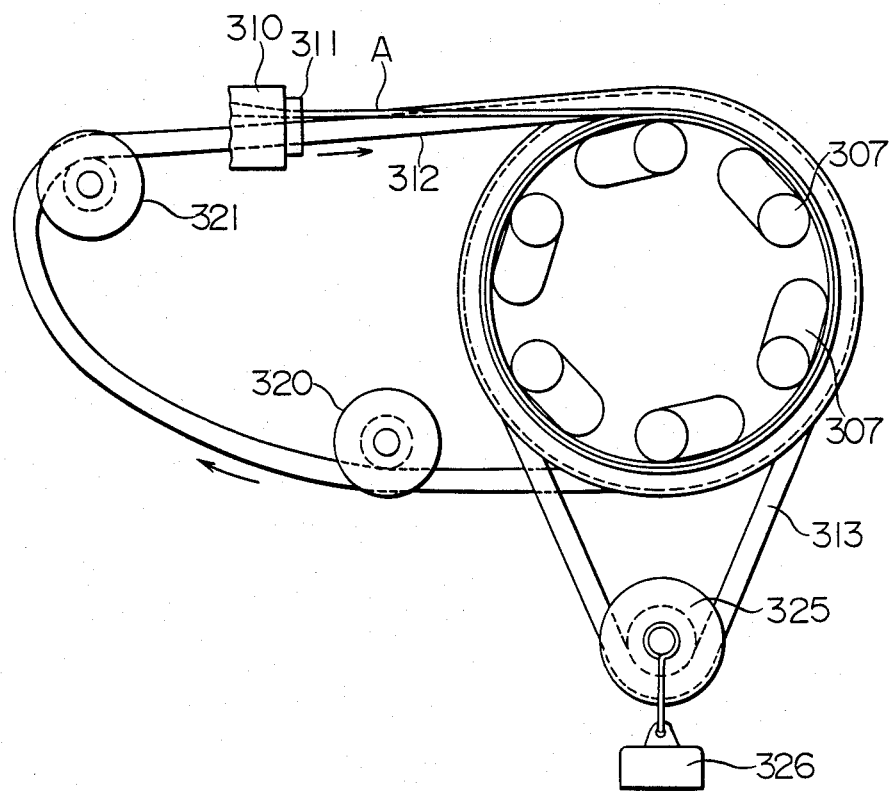
FIG. 23 is an end view showing the relation between a plastic ribbon and an endless forming core belt according to a still further embodiment of the present invention.

FIG. 23 shows a still further example of manufacturing a plastic pipe according to the present invention. In this example, an endless forming core belt 312 passes through a die 311 of an extruder 310 so that a plastic ribbon A ejected from the extruder 310 has the endless forming core belt 312 embedded therein. The plastic ribbon A produced by this method of FIG. 23 is formed into a plastic pipe as shown in FIG. 24. The plastic ribbon A has a ridge containing the endless forming core belt 12", so that the side portions of the adjacent plastic ribbons are overlapped and fused with each other. After completion of the spiral ridge on the outer surface of the plastic pipe C, cutting of the spiral ridge with a cutter 13, removing the endless forming core belt 12" therefrom and fusing a narrow plastic ribbon B to the spiral ridge to seal a slit 14" can be conducted in the same way as described above.

The plastic ribbon A and the narrow plastic ribbon B used in the present invention may be made of various thermoplastic resins such as polyethylene, polypropylene and other polyolefins, polyvinyl chloride, etc. The plastic ribbon A and the narrow plastic ribbon B may be made of the same materials, but it is possible that the plastic ribbon A is made of soft resins and the narrow plastic ribbon B is made of relatively hard resins.

With respect to the endless forming core belt, it may be made of various materials such as hard rubbers, synthetic resins, leathers, etc. It may also be made of metals such as aluminum as long as it consists of separate belt blocks attached to an endless flexible support member. Also, it may have various cross section, such as a trapezoidal or semicircular cross section, depending upon what spiral ridge is required.

As described above, since the spiral ridge of the plastic pipe according to the present invention is formed by first forming it with the endless forming core belt, cutting the spiral ridge to remove the forming core belt through a slit and then sealing the slit of the spiral ridge with a narrow plastic ribbon, it can be made hollow without deformation. Thus, the plastic pipe of the present invention has a spiral ridge of accurate shape on the outer surface. Further, it has a flat inner surface. In this connection, please note that although the attached figures show relatively uneven inner surfaces of the plastic pipes, this is to emphasize the relation of adjacent plastic ribbons in the plastic pipe of the present invention, and that their inner surfaces are substantially flat because the plastic ribbons are deformed, when it is sufficiently soft, by the forming rolls in the spiral winding operation.

The present invention has been explained referring to the attached drawings, but it should be noted that it is not restricted thereto and that any modifications and changes are possible unless they deviate from the scope of the present invention defined by the claims attached hereto.

What is claimed is:

1. A method of manufacturing a plastic pipe having a spiral ridge on an outer surface and a flat inner surface, comprising the steps of:
   (a) supplying a plastic ribbon in a softened state onto a plurality of rotating forming rolls arranged circularly, so that said plastic ribbon is spirally wound around said forming rolls while partially overlapping to be fused with each other;
   (b) spirally winding an endless forming core belt around said forming rolls in such a manner that said endless forming core belt is sandwiched between the plastic ribbon already wound around said forming rolls and the plastic ribbon newly supplied, thereby providing the resulting plastic pipe with a spiral ridge:
   (c) cutting said spiral ridge after the plastic ribbon is fused with each other and sufficiently cooled, thereby providing said spiral ridge with a slit extending along it to remove said endless forming core belt from it; and
   (d) winding a second plastic ribbon in a softened state around said spiral ridge to fuse said second plastic ribbon thereto, thereby sealing said slit.

2. The method of manufacturing a plastic pipe according to claim 1, further comprising the step of spirally winding a second forming belt so that it is received in a spiral groove between the adjacent ridges of said plastic pipe to ensure the formation of the spiral ridge of accurate shape in cooperation with said endless forming core belt.

3. The method of manufacturing a plastic pipe according to claim 1, further comprising the step of placing at least one second forming belt in each spiral groove between the adjacent ridges of said plastic pipe and pulling it downwardly to ensure the formation of the spiral ridge of accurate shape in cooperation with said endless forming core belt.

4. An apparatus for manufacturing a plastic pipe having a spiral ridge on an outer surface and a flat inner surface, comprising:
   (a) a plurality of rotatable forming rolls arranged circularly:
   (b) first means positioned near the rear ends of said rotatable forming rolls for supplying a plastic ribbon in a softened state to said rotatable forming rolls;
   (c) an endless forming core belt, part of which is wound around said rotatable forming rolls in such a manner that said endless forming core belt is sandwiched between the plastic ribbon already wound around said rotatable forming rolls and the plastic ribbon newly supplied from said first means, thereby providing said resulting plastic pipe with a spiral ridge;
   (d) a cutter for providing the spiral ridge with a slit extending along it to remove said endless forming core belt therefrom; and
   (e) second means provided on the downstream of said cutter for supplying a second plastic ribbon which is to be fused to said spiral ridge to seal said slit.

5. The apparatus for manufacturing a plastic pipe according to claim 4, wherein said endless forming core belt is provided on the top surface thereof with a longitudinal groove adapted to receive said cutter during the cutting operation of said spiral ridge.

6. The apparatus for manufacturing a plastic pipe according to claim 4, further comprising a rotatable means and a guide roll both positioned near said rotatable forming rolls, said endless forming core belt circulating them in such a manner that it is first wound around said rotatable forming rolls and then wound around said rotatable means and goes back to said rotatable forming rolls through said guide roll.

7. The apparatus for manufacturing a plastic pipe according to claim 6, wherein said rotatable means comprises a plurality of second rotatable rolls arranged circularly and extending in the same direction as said rotatable forming rolls, and said endless forming core belt is wound around said rotatable forming rolls by a plurality of turns from near the rear ends of said rotatable forming rolls toward the tip ends thereof, and wound around said second rotatable rolls by a plurality of turns in the opposite direction, and goes back to said rotatable forming rolls through said guide roll.

8. The apparatus for manufacturing a plastic pipe according to claim 4, further comprising a second forming belt spirally wound around the resulting plastic pipe containing said endless forming core belt in said spiral ridge, for ensuring the accurate shape of the spiral ridge in cooperation with said endless forming core belt.

9. The apparatus for manufacturing a plastic pipe according to claim 4, further comprising at least one second forming belt received in each spiral groove between the adjacent ridges of said plastic pipe for accurately forming the spiral ridge in cooperation with said endless forming core belt.

* * * * *